(12) United States Patent
Sumii

(10) Patent No.: US 7,289,191 B2
(45) Date of Patent: Oct. 30, 2007

(54) ILLUMINATION OPTICAL SYSTEM, AND IMAGE DISPLAY APPARATUS AND IMAGE EXPOSURE APPARATUS USING THE SAME

(75) Inventor: Katsuto Sumii, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 286 days.

(21) Appl. No.: 10/225,345

(22) Filed: Aug. 22, 2002

(65) Prior Publication Data

US 2003/0038930 A1 Feb. 27, 2003

(30) Foreign Application Priority Data

Aug. 22, 2001 (JP) .............................. 2001-251269

(51) Int. Cl.
  G03B 27/58 (2006.01)
  G03B 27/72 (2006.01)
  G03B 27/42 (2006.01)
(52) U.S. Cl. .............................. 355/47; 355/71; 355/53
(58) Field of Classification Search .................. 355/47, 355/49, 53, 57; 359/618, 224, 291; 430/396, 430/322; 347/239
  See application file for complete search history.

(56) References Cited

U.S. PATENT DOCUMENTS 5,870,176 A * 2/1999 Sweatt et al. .................. 355/53
6,238,852 B1 * 5/2001 Klosner ....................... 430/396
6,379,867 B1 * 4/2002 Mei et al. .................... 430/296
6,552,779 B2 * 4/2003 Mei ............................. 355/71
6,687,041 B1 * 2/2004 Sandstrom ................... 359/291
2002/0118375 A1 * 8/2002 Ramanujan et al. .......... 358/1.2
2002/0171816 A1 * 11/2002 Markle ......................... 355/67
2003/0086177 A1 * 5/2003 Kowarz et al. ............. 359/618

* cited by examiner

Primary Examiner—Peter B. Kim
(74) Attorney, Agent, or Firm—Sughrue Mion, PLLC

(57) ABSTRACT

The illumination optical system includes an illumination light source and a spatial light modulator having a plurality of elements which reflect incident light from the illumination light source to form outgoing light and which flexibly switch a deflecting direction of a principal ray of the outgoing light between at least two directions including a first deflecting direction and a second deflecting direction, wherein a first angle between an incident direction of a principal ray of the incident light and the first deflecting direction is set to be approximately equal to a second angle between the first deflecting direction and the second deflecting direction and/or the first and second deflecting directions of the principal ray of the outgoing light inclines with reference to a normal line to an element array surface of the spatial light modulator. The image display apparatus and the image exposure apparatus have the above illumination optical system.

49 Claims, 8 Drawing Sheets

ILLUMINATION OPTICAL SYSTEM, AND IMAGE DISPLAY APPARATUS AND IMAGE EXPOSURE APPARATUS USING THE SAME

BACKGROUND OF THE INVENTION

The present invention relates to an illumination optical system used in an image display apparatus such as a projector which displays an image formed by controlling a direction in which outgoing light is polarized using a spatial light modulator such as a micro mirror array and in an image exposure apparatus which exposes a light-sensitive material to light bearing the thus formed image.

At present, a two-dimensional spatial light modulator such as a micro mirror array (hereinafter, referred to as "MMA") which is commercially available as, for example, a Digital Micromirror Device™ (DMD) manufactured by Texas Instruments Inc. that create a two-dimensional image by controlling the deflecting angles of fine mirrors (micro mirrors) disposed two-dimensionally are widely utilized in image display apparatuses such as projectors for displaying an image, exposure/recording apparatuses for recording an image on a light-sensitive material by exposure to light bearing the image, and image exposure apparatuses such as a light molding apparatus using a photo-curing resin, and so on.

The MMA is a two-dimensional spatial light modulator having a plurality of rectangular micro mirrors which rotate about predetermined rotation axis, which are used to reflect incident light from an illumination light source to thereby form outgoing light, and optionally switch the deflecting direction of the outgoing light. The rotational angle of each micro mirror can be switched between +10° and −10° by rotating it making use of electrostatic force, and the deflecting direction of the outgoing light formed by reflecting the incident light can be switched for each micro mirror between the two rotational angles. Thus, the deflecting direction of each micro mirror can be controlled so that the outgoing light in the deflecting direction can bear an On- or Off-modulated image. Accordingly, the outgoing light in the deflecting direction can be referred to as activated light and deactivated light, respectively.

For example, in a projector 100 making use of an MMA shown in FIG. 8, light emitted from a light source lamp 102 passes through a lens group 104 and is reflected by a mirror 106, and then is incident on an MMA 108 as incident light. In contrast, since the deflecting angle is set for each micro mirror of the MMA 108, the incident light is reflected in a predetermined deflecting direction to form outgoing light, which travels toward a direction where a projection lens 110 is disposed, passes therethrough and is imaged on a screen 112, whereby an image is projected.

The light incident on the MMA 108 after having been reflected by the mirror 106 and the outgoing light after reflection by the micro mirrors of the MMA 108 has a relationship as shown in FIG. 9.

That is, the incident light $L_{in}'$ from the mirror 106 is incident on the MMA 108 such that the principal ray thereof forms an inclination angle of 20° with respect to a normal line to the surface on which the micro mirrors of the MMA 108 are arranged. In contrast, in a state in which the rotational angle of the micro mirror of the MMA 108 is set at +10°, a normal direction to the micro mirror surface is a direction C shown in FIG. 9, and outgoing light $L_{on}'$ (activated light) having a principal ray in a direction perpendicular to the surface on which the micro mirrors of the MMA 108 are arranged is caused to outgo. That is, the outgoing light $L_{on}'$ having the principal ray in a direction that agrees with the optical axis of the projection lens 110 is caused to outgo thereto. Since the principal ray of the outgoing light $L_{on}'$ is caused to agree with the optical axis of the projection lens 110 as described above, it is possible to make a lens performance to effectively act on the outgoing light $L_{on}'$ by minimizing a load on the projection lens 110.

In contrast, when the rotational angle of the micro mirror is set at −10°, a normal direction to the micro mirror surface is a direction D shown in FIG. 9, and outgoing light $L_{off}'$ (deactivated light) having a principal ray in a direction of 40° downward in FIG. 9 with respect to the normal line to the surface on which the micro mirrors of the MMA 108 are arranged is caused to outgo.

Incidentally, in the projector 100 described above, it is required to broaden the light flux divergent/convergent angle of the incident light $L_{in}'$ because it is desired to increase the quantity of the incident light $L_{in}'$ as much as possible in order to brightly project an image on the screen 112. However, the light flux divergent/convergent angle of the incident light $L_{in}'$ is restricted because it is necessary for the incident light $L_{in}'$ not to overlap the outgoing light $L_{on}'$ from which a problem is arisen in that the quantity of the incident light $L_{in}'$ cannot be increased.

In the example shown in FIG. 9, the light flux divergent/convergent angle of the incident light $L_{in}'$ is restricted to 20° or less from its relationship to the outgoing light $L_{off}'$, and the light flux divergent/convergent angle corresponds to F 2.8 in term of F number.

Ordinarily, in the apparatus as described above, an illumination optical system is designed with an F number of about 3.0 or more such that the incident light $L_{in}'$ cannot overlap the outgoing light $L_{off}'$. Accordingly, there is a problem in that the quantity of incident light on the two-dimensional spatial light modulator such as the MMA cannot be increased because of the restriction of the light flux divergent/convergent angle of the incident light to the level of F 3.0 more at which higher brightness cannot be provided.

These problems are not limited to the image display apparatus such as the projector, but are common to apparatuses including the illumination optical system using the spatial light modulator such as an exposure apparatus that records an image formed using the spatial light modulator on a light-sensitive material by exposure, and a light molding apparatus.

SUMMARY OF THE INVENTION

Accordingly, an object of the present invention, which was made to solve the above problems, is to provide an illumination optical system having an illumination light source and a spatial light modulator such as an MMA in which a quantity of incident light can be increased as well as activated light is definitely separated from deactivated light and the contrast of an image is not deteriorated.

Another object of the present invention is to provide an image display apparatus using the illumination optical system.

Still another object of the present invention is to provide an image exposure apparatus using the illumination optical system.

In order to achieve the above and other objects, according to a first aspect of the present invention, there is provided an illumination optical system comprising an illumination light source; and a spatial light modulator having a plurality of elements which reflect incident light from the illumination light source to form outgoing light and which flexibly switch a deflecting direction of a principal ray of the outgoing light between at least two directions including a first deflecting direction and a second deflecting direction, wherein a first angle between an incident direction of a principal ray of the incident light and the first deflecting direction is set to be approximately equal to a second angle between the first deflecting direction and the second deflecting direction.

Preferably, a light flux divergent/convergent angle of the incident light is set to be equal to or smaller than the first angle between the incident direction of the principal ray of the incident light and the first deflecting direction.

Preferably, the illumination optical system further comprises an optical element which is disposed in front of the spatial light modulator, and which has a first boundary surface for totally reflecting the incident light traveling to the spatial light modulator and causing the outgoing light in the first deflecting direction to pass therethrough and a second boundary surface for causing the outgoing light in the first deflecting direction to pass therethrough and totally reflecting the outgoing light in the second deflecting direction.

According to a second aspect of the present invention, there is provided an illumination optical system comprising an illumination light source; and a spatial light modulator having a plurality of elements which reflect incident light from the illumination light source to form outgoing light and which flexibly switch a deflecting direction of a principal ray of the outgoing light between at least two directions including a first deflecting direction and a second deflecting direction, wherein the first and second deflecting directions of the principal ray of the outgoing light inclines with reference to a normal line to an element array surface of the spatial light modulator.

In the illumination optical system of the second aspect, it is preferred that a first angle between an incident direction of a principal ray of the incident light and the first deflecting direction is set to be approximately equal to a second angle between the first deflecting direction and the second deflecting direction.

In the illumination optical system of the second aspect, it is also preferred that a light flux divergent/convergent angle of the incident light is set to be equal to or smaller than the first angle between the incident direction of the principal ray of the incident light and the first deflecting direction.

Preferably, the illumination optical system of the second aspect further comprises an optical element which is disposed in front of the spatial light modulator, and which has a first boundary surface for totally reflecting the incident light traveling to the spatial light modulator and causing the outgoing light in the first deflecting direction to pass therethrough and a second boundary surface for causing the outgoing light in the first deflecting direction to pass therethrough and totally reflecting the outgoing light in the second deflecting direction.

According to a third aspect of the present invention, there is provided an image display apparatus comprising an illumination optical system which includes an illumination light source; and a spatial light modulator having a plurality of elements which reflect incident light from the illumination light source to form outgoing light and which flexibly switch a deflecting direction of a principal ray of the outgoing light between at least two directions including a first deflecting direction and a second deflecting direction, wherein a first angle between an incident direction of a principal ray of the incident light and the first deflecting direction is set to be approximately equal to a second angle between the first deflecting direction and the second deflecting direction and wherein one of the outgoing light in the first deflecting direction and the outgoing light in the second deflecting direction is used to display an image.

According to a forth aspect of the present invention, there is provided an image display apparatus comprising an illumination optical system which includes an illumination light source; and a spatial light modulator having a plurality of elements which reflect incident light from the illumination light source to form outgoing light and which flexibly switch a deflecting direction of a principal ray of the outgoing light between at least two directions including a first deflecting direction and a second deflecting direction, wherein the first and second deflecting directions of the principal ray of the outgoing light inclines with reference to a normal line to an element array surface of the spatial light modulator and wherein one of the outgoing light in the first deflecting direction and the outgoing light in the second deflecting direction is used to display an image.

According to a fifth aspect of the present invention, there is provided an image exposure apparatus having an illumination optical system which includes an illumination light source; and a spatial light modulator having a plurality of elements which reflect incident light from the illumination light source to form outgoing light and which flexibly switch a deflecting direction of a principal ray of the outgoing light between at least two directions including a first deflecting direction and a second deflecting direction, wherein a first angle between an incident direction of a principal ray of the incident light and the first deflecting direction is set to be approximately equal to a second angle between the first deflecting direction and the second deflecting direction and wherein one of the outgoing light in the first deflecting direction and the outgoing light in the second deflecting direction is used for exposure.

According to a sixth aspect of the present invention, there is provided an image exposure apparatus having an illumination optical system which includes an illumination light source; and a spatial light modulator having a plurality of elements which reflect incident light from the illumination light source to form outgoing light and which flexibly switch a deflecting direction of a principal ray of the outgoing light between at least two directions including a first deflecting direction and a second deflecting direction, wherein the first and second deflecting directions of the principal ray of the outgoing light inclines with reference to a normal line to an element array surface of the spatial light modulator and wherein one of the outgoing light in the first deflecting direction and the outgoing light in the second deflecting direction is used for exposure.

DETAILED DESCRIPTION OF THE INVENTION

An illumination optical system of the present invention as well as an image display apparatus and an image exposure apparatus using the illumination optical system will be described below in detail based on the preferred embodiments shown in the accompanying drawings.

Figure 1A:
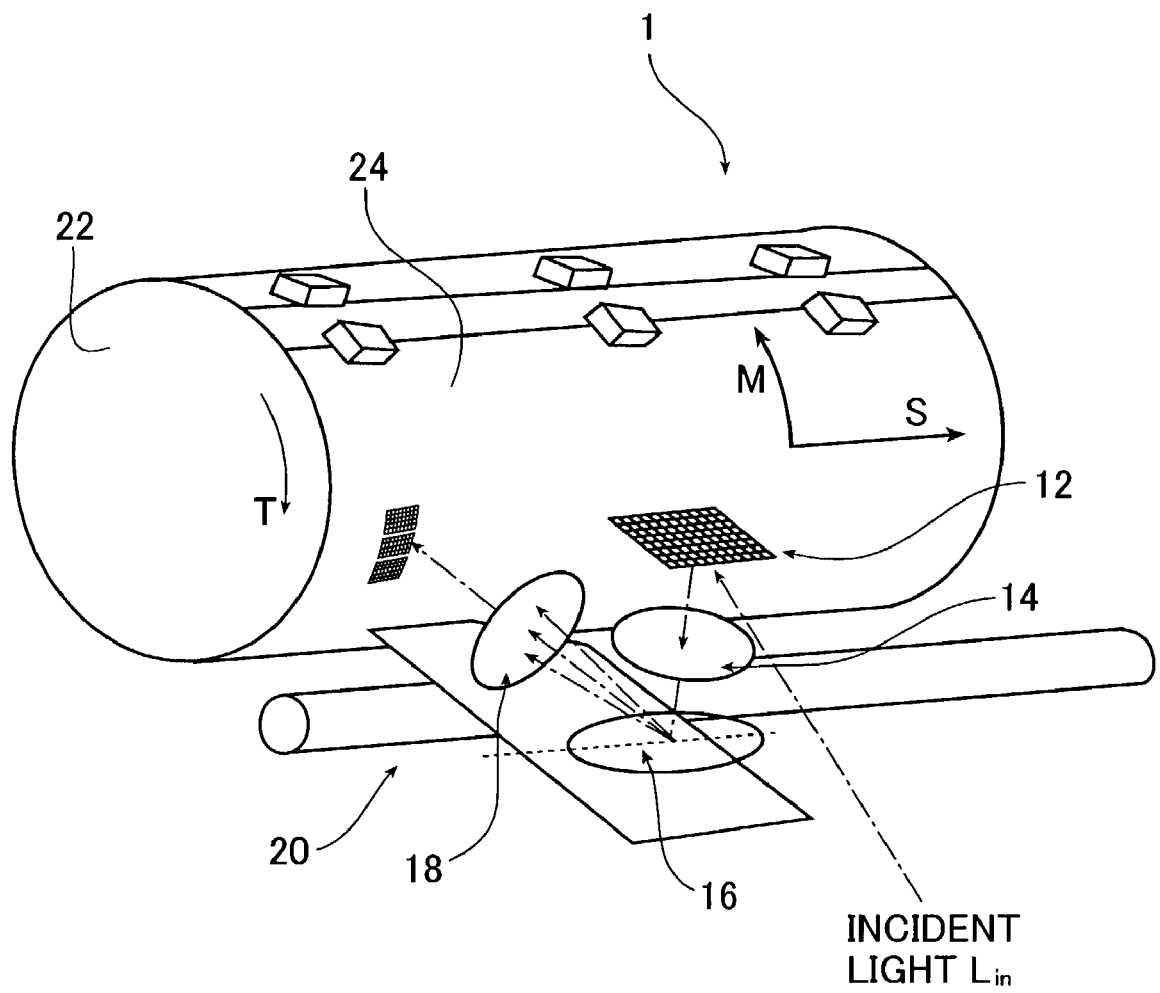
FIGS. 1A and 1B are views showing the schematic arrangement of an example of an image exposure apparatus of the present invention using an illumination optical system of the present invention.
Figure 1B:
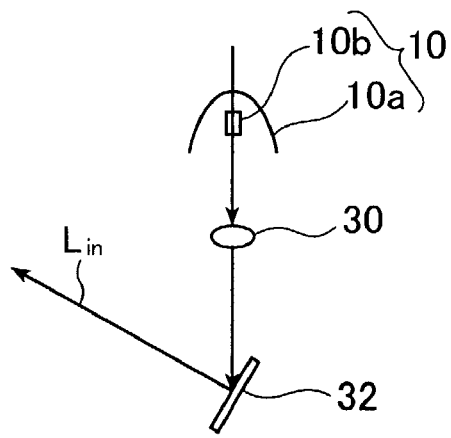

FIGS. 1A and 1B show the schematic arrangements of the illumination optical system of the present invention and an image exposure apparatus 1 as an example of the image exposure apparatus using the illumination optical system.

The image exposure apparatus 1 is an apparatus for recording an image by two-dimensionally scan-exposing a recording medium using a two-dimensional array of reflected light source elements produced in a two-dimensional spatial light modulator such as a micro mirror array (hereinafter, referred to as "MMA") known as Digital Micromirror Device™ (DMD) by illumination with illumination light flux and a so-called external drum (external surface drum).

In FIGS. 1A and 1B, the image exposure apparatus 1 includes an illumination light source 10, an MMA 12 for receiving illumination light flux emitted from the illumination light source 10, a collimator lens optical system 14, a light deflector 16, a focusing lens optical system 18, an auxiliary scanning drive system 20, and an external drum (outer drum) 22 (hereinafter, simply referred to as "drum" 22). Further, the drum 22 has a recording medium 24 wound around the outer surface thereof.

The illumination light source 10 has a light source lamp 10a and a reflector 10b, and various types of light source lamps may be used as the light source lamp 10a in accordance with the spectral sensitivity of a recording medium being used. For example, an ultra-high pressure mercury lamp, a metal halide lamp, and the like may be used as the light source lamp when a plate-making film and a conventional PS plate, which are sensitive to visible light and ultraviolet light, are used as the recording medium.

Further, an infrared broad area laser diode, and the like may be used in the case of a heat mode plate which is sensitive to infrared light. In addition to the above, an LED, a halogen lamp, a xenon lamp, and the like may also be used in accordance with the recording medium being used.

The illumination light having been emitted from the illumination light source 10 passes through a lens group 30, is reflected by a mirror 32 and is incident on the MMA 12 as incident light $L_{in}$.

As described above, the MMA 12 can optionally switch micro mirrors between rotational angles of +10° and −10°, whereby the MMA 12 can emit outgoing light $L_{on}$ (activated light) and outgoing light $L_{off}$ (deactivated light) in two deflecting directions. Electrostatic force is used to switch the micro mirrors between the two rotational angles, and outgoing light bearing an image is formed by modulating light by activating and deactivating exposure light for each micro mirror. That is, the respective micro mirrors of the MMA 12 correspond to the pixels of an image to be formed, and the intervals at which the respective micro mirrors are disposed correspond to the pitches of the pixels of the image formed by a light source group. Accordingly, it can be understood that the micro mirrors constituting the MMA 12 correspond to pixels on the surface on which the micro mirrors of the MMA 12 are arranged. The MMA 12 is formed on a silicon chip by a micromachine technology making use of a process for manufacturing a semiconductor device.

The MMA 12 used in the image exposure apparatus 1 of the illustrated example has, for example, 1024 pixels×1280 pixels disposed at a pixel pitch of 17 μm. Further, respective components are disposed such that the rotational direction (shown by an arrow T in FIG. 1A) of the drum 22, which will be described later, optically agrees with the direction of pixel train of the 1024 pixels imaging on the recording medium 24 (hereinafter, this direction shown by an arrow M in FIG. 1A is referred to as a main scan direction) and that the direction of the rotation axis of the drum 22 optically agrees with the direction of pixel train of the 1280 pixels imaging on the recording medium 24 (hereinafter, this direction shown by an arrow S in FIG. 1A is referred to as an auxiliary scan direction).

Note that the spatial light modulator used in the present invention is not limited to the MMA 12 of the illustrated example, and a grating light valve (GLV), and the like may be used, in addition to the spatial light modulator. The grating light valve is a device that has a reflecting surface formed of a plurality of fine ribbon-shaped elements and creates outgoing light in a particular direction by causing diffraction by light reflected by the plurality of ribbon-shaped elements having been displaced in a direction perpendicular to the reflecting surface. The grating light valve is formed on a silicon chip by the micromachine technology.

The collimator lens optical system 14 is used to allow the light reflected by the MMA 12 to be incident on the light deflector 16 as collimated light.

The light deflector 16 deflects the light incident through the collimator lens optical system 14 in the main scan direction M in synchronism with the rotation of the drum 22. That is, the light deflector 16 is driven by a drive unit (light deflector driver) omitted in FIG. 1A and changes the direction of light in synchronism with the rotation of the drum 22 so that an image is formed at the same position of the recording medium 24 even if the drum 22 rotates. Preferred examples of the light deflector 16 include a galvano-scanner, polygonal mirror, piezo system, and the like.

Further, the focusing lens optical system 18 images the light deflected by the light deflector 16 on the recording medium 24 wound around the drum 22 and exposes the recording medium 24 to the light.

The collimator lens optical system 14 is disposed such that the MMA 12 is disposed at the front focal position of the collimator lens optical system 14 and that the exposed portion of the recording medium 24 is disposed at the rear focal position of the focusing lens optical system 18, whereby the image is formed on the recording medium 24.

The collimated light reflected by the MMA 12 is finally imaged on the recording medium 24 held on the surface of the external drum 22. Examples of the recording medium 24 include a light mode sensitive material, heat mode sensitive material, and the like. Further, the recording medium is not particularly limited and may be a film or plate.

The (external) drum 22 is a cylindrical drum which holds the recording medium 24 on the outside thereof and rotates in the direction shown by the arrow T in FIG. 1A about the rotation axis of the drum.

An optical system from the illumination light source to the focusing lens optical system 18 through the MMA 12, the collimator lens optical system 14, and the light deflector 16 is integrated together as a unit and moved in the auxiliary scan direction (direction S in FIG. 1A) at a predetermined speed by the auxiliary scan drive system 20.

Figure 2:
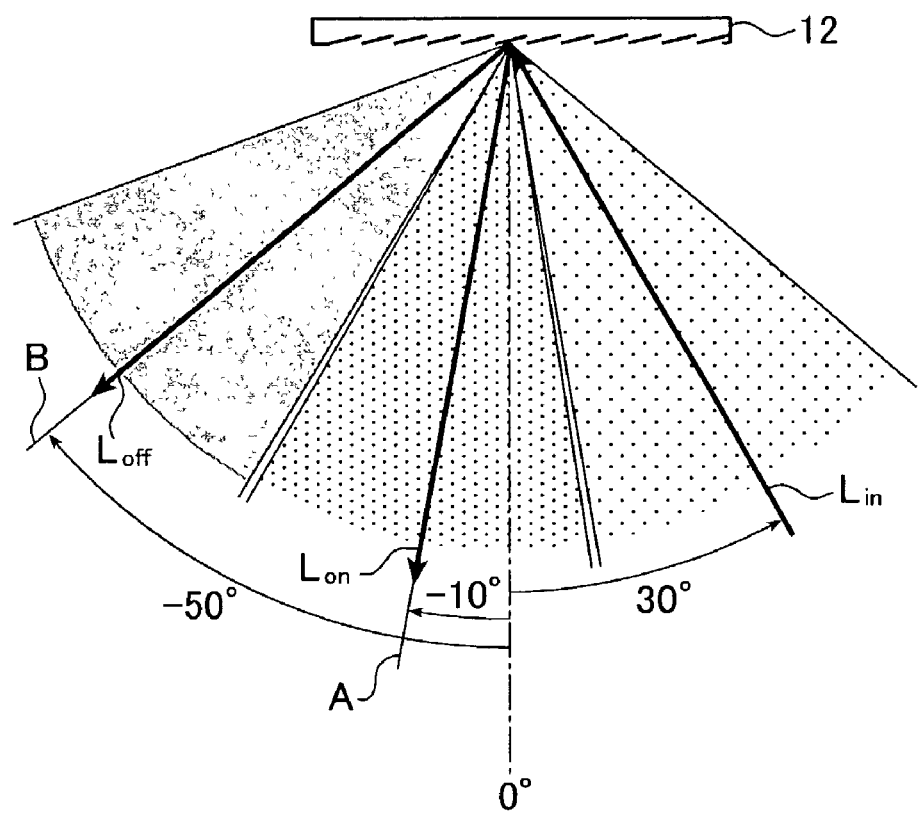
FIG. 2 is a view explaining an example of the illumination optical system in the image exposure apparatus shown in FIG. 1A.

The illumination optical system used to form the image in the image exposure apparatus 1 comprises the illumination light source 10, the lens group 30, the mirror 32, and the MMA 12. As shown in FIG. 2, the mirror 32, and the like are adjusted so that the principal ray of the incident light $L_{in}$ on the MMA 12 is inclined 30° with respect to a normal line to the surface on which the micro mirrors of the MMA 12 are arranged. When the micro mirrors have a rotational angle set at +10°, outgoing light $L_{on}$, which has a principal ray in a direction A that inclines 10° with respect to the direction normal to the micro mirror array surface, is obtained, whereas when the micro mirrors have a rotational angle set at −10°, outgoing light $L_{off}$, which has a principal ray in a direction B that inclines −50° with respect to the direction normal to the micro mirror array surface, is obtained. The outgoing light $L_{on}$ passes through the collimator lens optical system 14 and is finally focused on the recording medium 24.

As described above, the incident light $L_{in}$ forms an inclination angle of 30° with respect to the normal line to the MMA 12. This is because the angle between the incident direction of the principal ray of the incident light $L_{in}$ and the deflecting direction (direction A) of the principal ray of the outgoing light $L_{on}$ is made approximately equal to the angle between the deflecting direction of the principal ray of the outgoing light $L_{on}$ and the deflecting direction (direction B) of the principal ray of the outgoing light $L_{off}$. Making both the angles approximately equal to each other means that the angular difference therebetween is within 10°.

With this arrangement, the light flux divergent/convergent angle of the incident light $L_{in}$ of up to 40° is possible. F 1.37 can be secured at the light flux divergent/convergent angle of 40°, thereby the quantity of the incident light $L_{in}$ can be sufficiently increased.

The angle between the incident direction of the principal ray of the incident light $L_{in}$ and the deflecting direction of the principal ray of the outgoing light $L_{on}$ can be made approximately equal to the angle between the deflecting direction of the principal ray of the outgoing light $L_{on}$ and the deflecting direction of the principal ray of the outgoing light $L_{off}$ by adjusting the incident light $L_{in}$ such that the deflecting direction of the principal ray of the outgoing light $L_{on}$ is inclined with respect to the direction normal to the micro mirror array surface in the MMA 12 in which each micro mirror has a rotational angle set at +10° or −10° as described above.

Note that the incident angle of the principal ray of the incident light $L_{in}$ illustrated in FIG. 2 is based on the premise that the rotational angle of each micro mirror of the MMA 12 is set at +10° or −10°. However, the illumination optical system of the present invention is by no means limited thereto and may use a spatial light modulator having an element capable of optionally switching the deflecting direction of the principal ray of outgoing light between at least two directions thereby setting the incident angle of the incident light in accordance with the spatial light modulator used such that the angle between the incident direction of the principal ray of the incident light and a first deflecting direction of the principal ray of outgoing light can be made approximately equal to the angle between the first deflecting direction of the principal ray of the outgoing light and a second deflecting direction of the principal ray of the outgoing light.

Figure 3:
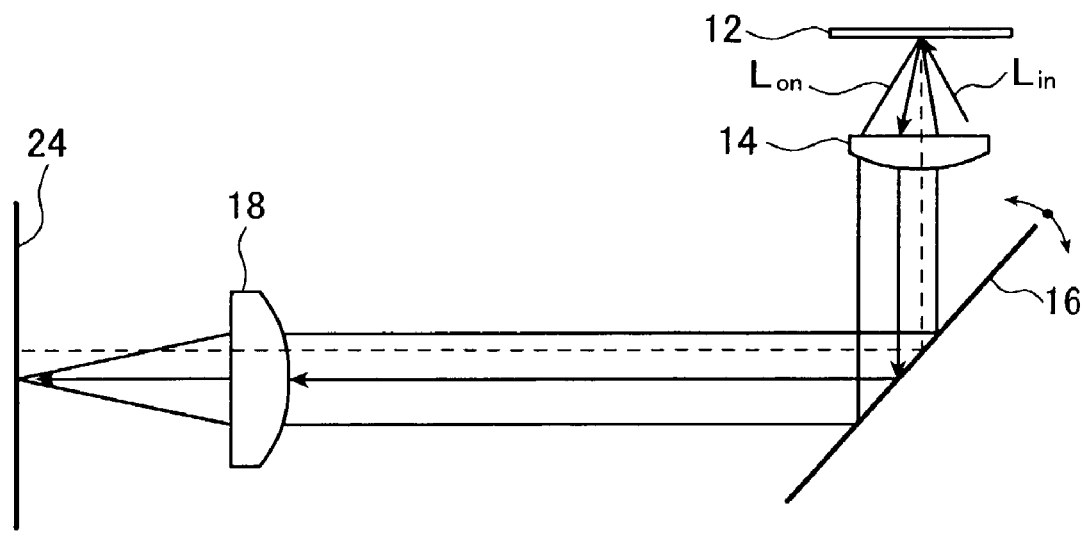
FIG. 3 is a view explaining an example of the layout of the lens optical system in the image exposure apparatus shown in FIG. 1A.

With this arrangement, the outgoing light $L_{on}$ reaches the light deflector 16 and then reaches the focusing lens optical system 18 by being deflected in accordance with the deflecting angle. It is preferable to dispose the collimator lens optical system 14 parallel to the surface on which the micro mirrors of the MMA 12 are arranged, as shown in FIG. 3. The principal ray of the outgoing light $L_{on}$ is not perpendicular to the surface on which the micro mirrors of the MMA 12 are arranged and hence passes through the collimator lens optical system 14 at an angle inclined with respect to the optical axis of the collimator lens optical system 14, but an excellent image can be formed on the recording medium 24 by disposing the collimator lens optical system 14 parallel to the surface on which the micro mirrors of the MMA 12 are arranged.

While the light flux divergent/convergent angle of the incident light $L_{in}$ is set to be equal to the angle between the incident direction of the principal ray of the incident light $L_{in}$ and the deflecting direction of the principal ray of the outgoing light $L_{on}$ in the above embodiment, the light flux divergent/convergent angle may be smaller than the above angle in the present invention. However, it is preferable to make the light flux divergent/convergent angle of the incident light $L_{in}$ equal to the angle between the incident direction of the principal ray of the incident light $L_{in}$ and the deflecting direction of the principal ray of the outgoing light $L_{in}$ to secure a larger quantity of light.

In the above embodiment, the incident angle of the incident light $L_{in}$ is set so as to make the angle between the incident direction of the principal ray of the incident light $L_{in}$ and the deflecting direction (direction A) of the principal ray of the outgoing light $L_{on}$ approximately equal to the angle between the deflecting direction of the principal ray of the outgoing light $L_{on}$ and the deflecting direction (direction B) of the principal ray of the outgoing light $L_{off}$. In place of the above setting, however, the incident light $L_{in}$ and the outgoing light $L_{on}$, or the outgoing light $L_{on}$ and the outgoing light $L_{off}$, which are shown in FIG. 2, may be separated from each other making use of a totally reflecting prism disposed in front of the surface on which the micro mirrors of the MMA 12 are arranged, which will be described below.

Figure 4:
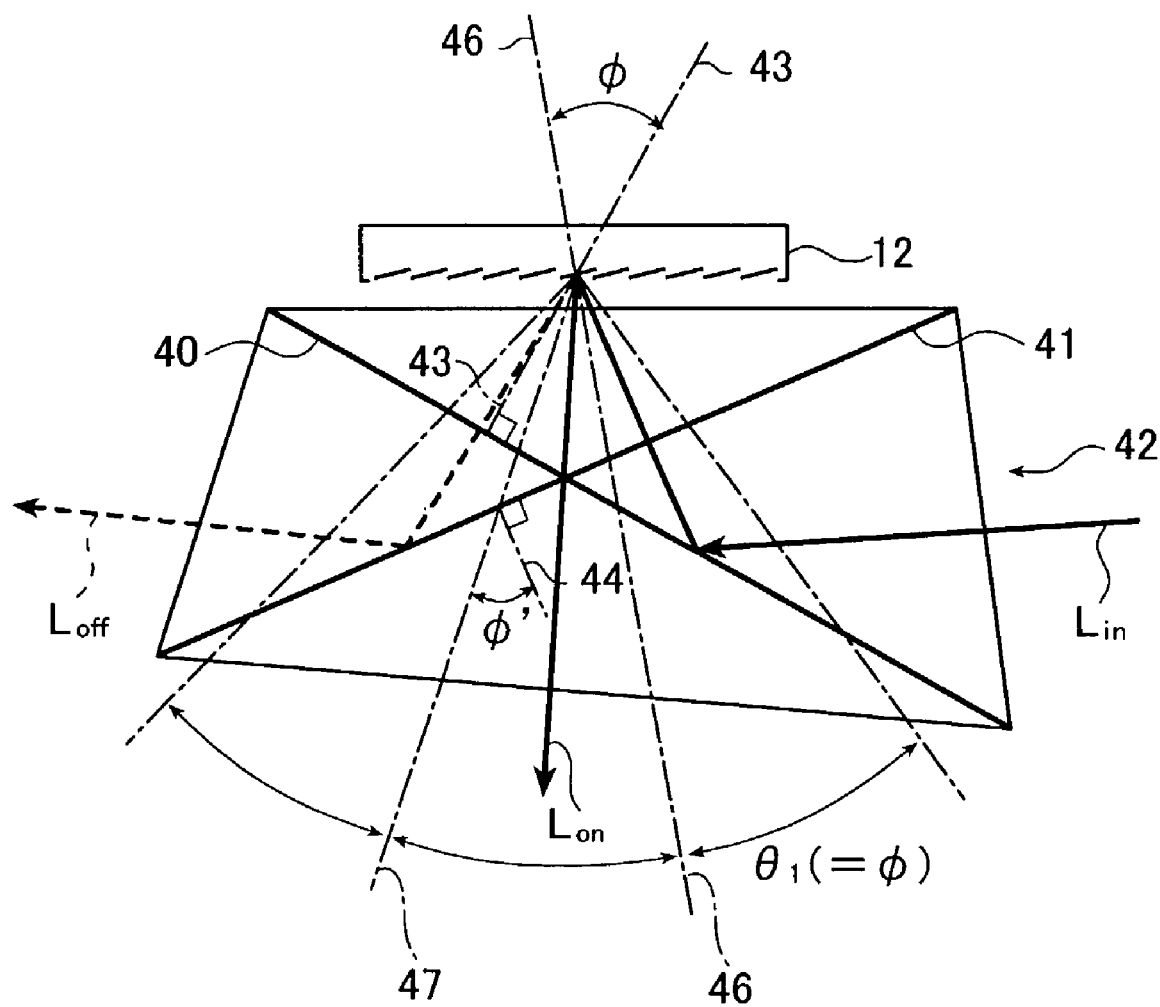
FIG. 4 is a view explaining the operation of light when a totally reflecting prism is applied to the image exposure apparatus shown in FIG. 1A.

For example, FIG. 4 shows a polygonal totally reflecting prism 42 having boundary surfaces 40 and 41 that act to totally reflect incident light or to cause the incident light to pass therethrough based on a predetermined critical angle.

As shown in FIG. 4, the totally reflecting prism 42 is an optical element that totally reflects the incident light $L_{in}$ and causes the outgoing light $L_{on}$ to pass therethrough on the boundary surface 40 as well as causes the outgoing light $L_{on}$ to pass therethrough and totally reflects the outgoing light $L_{off}$ on the boundary surface 41. The boundary surfaces 40 and 41 are formed by providing air gaps in a sheet state.

That is, the angle ϕ between the separating line 46 of the incident light $L_{in}$ and the outgoing light $L_{on}$ and the normal line 43 to the boundary surface 40 is used as a critical angle on the boundary surface 40 such that the incident light $L_{in}$ can be separated from the outgoing light $L_{on}$. Likewise, the angle ϕ' between the separating line 47 of the outgoing light $L_{on}$ and the outgoing light $L_{off}$ and the normal line 44 to the boundary surface 41 is used as a critical angle on the boundary surface 41 such that the outgoing light $L_{on}$ can be separated from the outgoing light $L_{off}$.

The provision of these critical angles can restrict the outgoing light $L_{on}$ in the range surrounded by the separating lines 46 and 47 even if the light flux divergent/convergent angle of the incident light $L_{in}$ exceeds $\theta_1$.

The employment of the total reflection by and transmission trough the boundary surfaces 40 and 41 as described above can broaden the light flux divergent/convergent angle of the incident light $L_{in}$ as mush as possible as well as can keep the light path of the incident light $L_{in}$ at a distance far from that of the outgoing light $L_{on}$ and the light path of the outgoing light $L_{off}$ at a distance far from that of the outgoing light $L_{on}$, thereby the respective light can be perfectly separated from each other. Accordingly, an image formed by the outgoing light $L_{on}$ can be made brighter and the contrast of the image is not decreased.

Further, the employment of the totally reflecting prism 42 permits the outgoing light $L_{on}$, which is restricted in the range sandwiched between the separating lines 46 and 47, to be obtained even from incident light having a wide light flux. Thus, the light flux divergent/convergent angle of the incident light $L_{in}$ on the totally reflecting prism 42 is not particularly limited. However, it is preferable to set the light flux divergent/convergent angle to be equal to or smaller than the angle between the incident direction of the principal ray of the incident light $L_{in}$ and the deflecting direction of the principal ray of the outgoing light $L_{on}$ wherever possible from a view point of effectively utilizing the illumination energy of the illumination light source.

The image exposure apparatus 1 is arranged as described above.

Operation of the image exposure apparatus 1 will now be described.

In the embodiment under consideration, when the whole image to be recorded on a sheet of the recording medium is exposed for recording, the image is divided into small segments in its entirety each of which is referred to as a frame. The size of the image of the one frame is determined by the number of trains of the micro mirrors of the MMA 12, that is, by the number of pixels of an image formed by the MMA 12. As described above, the MMA 12 of this embodiment bears 1024 pixels×1280 pixels, which represent the size of the one frame in this case.

When the image is exposed for recording, the image data of one frame is sent to the MMA 12 from the modulated signal generator (not shown) of the MMA 12, and the respective micro mirrors of the MMA 12 are controlled for activation and deactivation in accordance with the image data. When the incident light $L_{in}$ impinges on the micro mirrors, the outgoing light $L_{on}$ can be obtained by the reflection of the incident light $L_{in}$. Since the light flux divergent/convergent angle of the incident light $L_{in}$ is for example 40°, the outgoing light $L_{on}$ is caused to outgo at this angle.

The outgoing light $L_{on}$ is imaged on the recording medium 24 held on the surface of the rotating drum 22 through the collimator lens optical system 14, the light deflector 16, and the focusing lens optical system 18.

The drum 22 rotates in the direction shown by the arrow T in FIG. 1A at a constant speed. The light deflector 16 is driven by the light deflector driver (not shown) in synchronism with the rotational speed so as to deflect light in a direction opposite to the main scan direction M, whereby the image of the one frame which is imaged on the recording medium 24 is caused to stand stationary thereon without moving. Then, the image of the one frame is recorded (exposed) while the drum 22 rotates by the distance corresponding to one frame, that is, 1024 pixels or less in the direction opposite to the main scan direction M.

The embodiment described above is a so-called image tracking scan system in which the outgoing light $L_{on}$ is deflected by the light deflector 16 in synchronism with the movement of the recording medium 24 to cause the image to track the moving recording medium 24 such that the image to be formed on the recording medium 24 is rendered stationary with respect to the recording medium 24. However, the illumination optical system of the present invention is by no means limited thereto, and a so-called multi-exposure system may be applied to the present invention in which the image data is changed several times and sent to a plurality of micro mirrors of the MMA 12 to control the MMA 12 so that the respective micro mirrors can perform exposing operation several times whereby the image is moved in synchronism with the movement of the recording medium 24 to be rendered stationary on the recording medium 24.

Next, a projector as an image display apparatus using the illumination optical system of the present invention will be explained.

Figure 5:
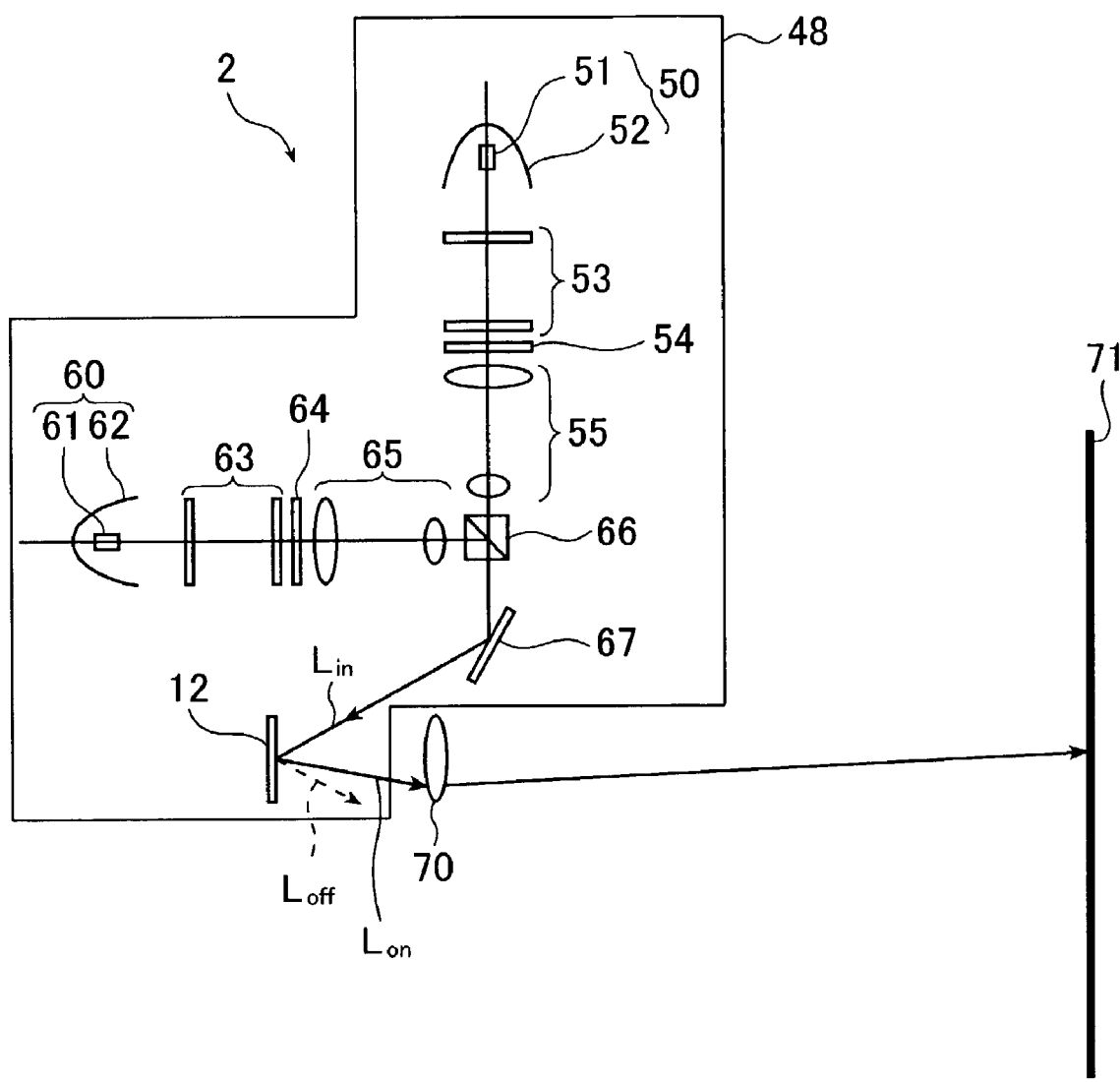
FIG. 5 is a view showing the schematic arrangement of an example of an image display apparatus using the illumination optical system of the present invention.

FIG. 5 shows the projector 2.

The projector 2 comprises an illumination optical system 48, a projection lens 70, and a screen 71.

The illumination optical system 48 includes an illumination light source 50 having a light source lamp 51 and a reflector 52, an illumination light source 60 having a light source lamp 61 and a reflector 62, lens groups 53, 55, 63, and 65, polarization converters 54 and 64, a polarized beam splitter 66, a mirror 67, and the MMA 12.

The illumination optical system 48 uses the polarization converters 54 and 64 to convert the non-polarized light from the light source lamps 51 and 61 to P-polarized light and S-polarized light, respectively, which are then combined together through the polarized beam splitter 66 to thereby produce light whose quantity of light is increased. The composite light is reflected by the mirror 67 before being incident on the MMA 12 as the incident light $L_{in}$.

The incident light $L_{in}$ on the MMA 12 has a light flux divergent/convergent angle of 40° as shown in FIG. 2 and moreover is incident on the MMA 12 in a state in which the principal ray thereof inclines 30° with respect to a normal line to the surface on which the micro mirrors of the MMA 12 are arranged. Accordingly, the outgoing light $L_{on}$ and outgoing light $L_{off}$ as shown in FIG. 2 are produced, and the outgoing light $L_{on}$ is caused to outgo to the projection lens 70, whereby a bright image is displayed on the screen 71. At the time, it is needless to say that the totally reflecting prism 42 described above may be disposed in front of the surface on which the micro mirrors of the MMA 12 are arranged.

Next, a light molding apparatus as an image exposure apparatus using the illumination optical system of the present invention will be explained.

Figure 6:
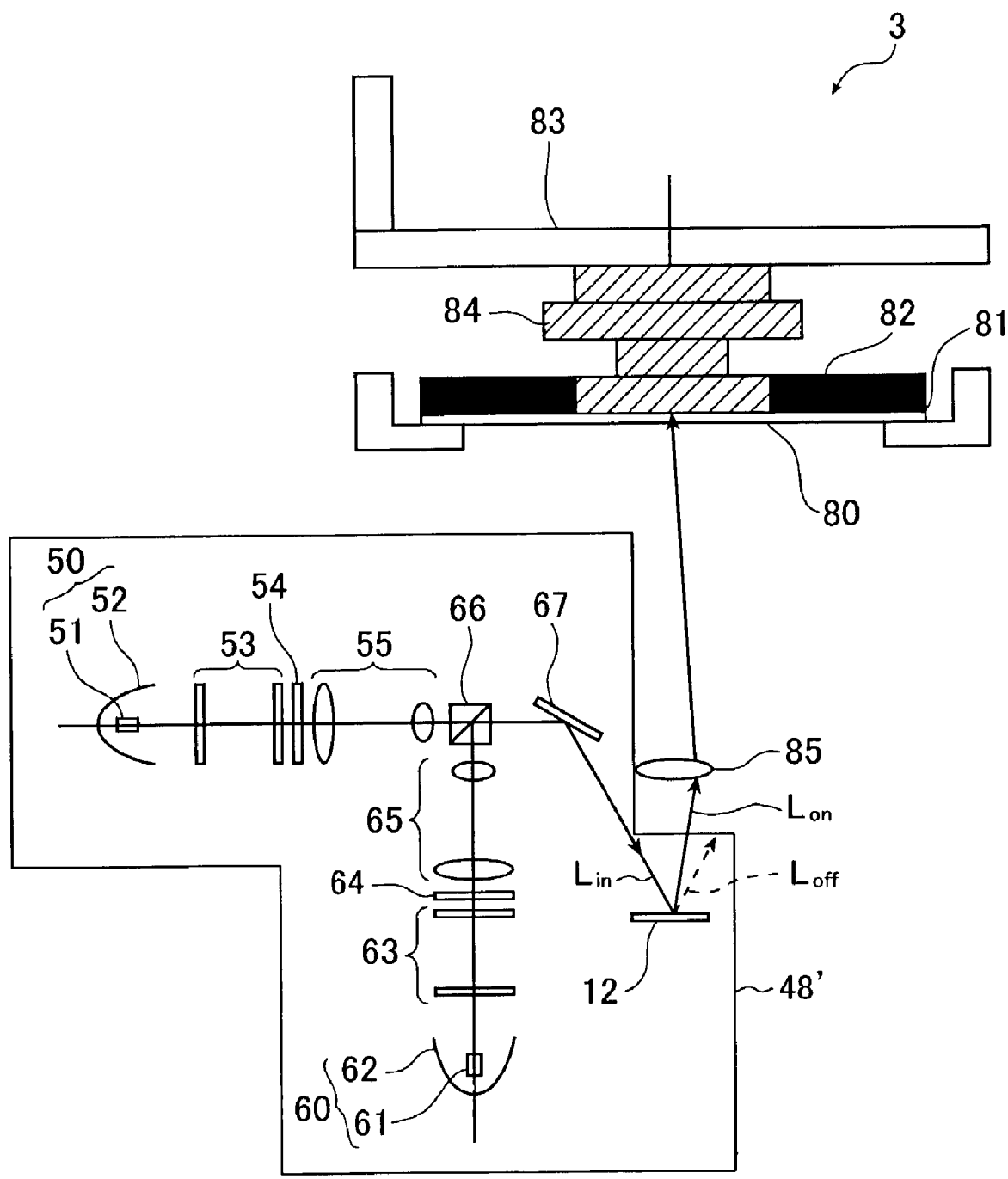
FIG. 6 is a view showing the schematic arrangement of an example of an image molding apparatus using the illumination optical system of the present invention.

FIG. 6 shows the light molding apparatus 3.

The light molding apparatus 3 employs a work pull-up system using a batch areal exposure.

That is, on a projection glass 80 is disposed a resin solution vessel 81 that is filled with a photo-curing resin solution 82. The resin solution 82 is cured by light irradiation. Then, when a stage 83 is pulled upward, a light-molded product 84 appears in which one layer of the resin solution 82 is cured. The light-molded product 84 is made by repeating the above process.

The light molding apparatus 3 comprises an illumination optical system 48', a projection lens 85 and a molding apparatus main body including the projection glass 80, the resin solution vessel 81, the stage 83, and the like.

The illumination optical system 48' includes the illumination light source 50 having the light source lamp 51 and the reflector 52, the illumination light source 60 having the light source lamp 61 and the reflector 62, the lens groups 53, 55, 63, and 65, the polarization converters 54 and 64, the polarized beam splitter 66, the mirror 67, and the MMA 12.

As in the illumination optical system 48 of the projector 2, the illumination optical system 48' uses the polarization converters 54 and 64 to convert the non-polarized light from the light source lamps 51 and 61 to P-polarized light and S-polarized light, respectively, which are then combined together through the polarized beam splitter 66 to thereby produce light whose quantity of light is increased. The composite light is reflected by the mirror 67 before being incident on the MMA 12 as the incident light $L_{in}$.

The incident light $L_{in}$ on the MMA 12 has a light flux divergent/convergent angle of 40° as shown in FIG. 2 and moreover is incident on the MMA 12 in a state in which the principal ray thereof inclines 30° with respect to a normal line to the surface on which the micro mirrors of the MMA 12 are arranged. Accordingly, the outgoing light $L_{on}$ and outgoing light $L_{off}$ as shown in FIG. 2 are produced, and the outgoing light $L_{on}$ is caused to outgo to the projection lens 85, whereby the resin solution 82 in the resin solution vessel 81 is cured in response to an image formed on the projection glass 80. At the time, it is needless to say that the totally reflecting prism 42 described above may be disposed in front of the surface on which the micro mirrors of the MMA 12 are arranged.

Next, an electrophotographic image recording apparatus, which is an example of the image exposure apparatus using the illumination optical system of the present invention, will be explained.

Figure 7:
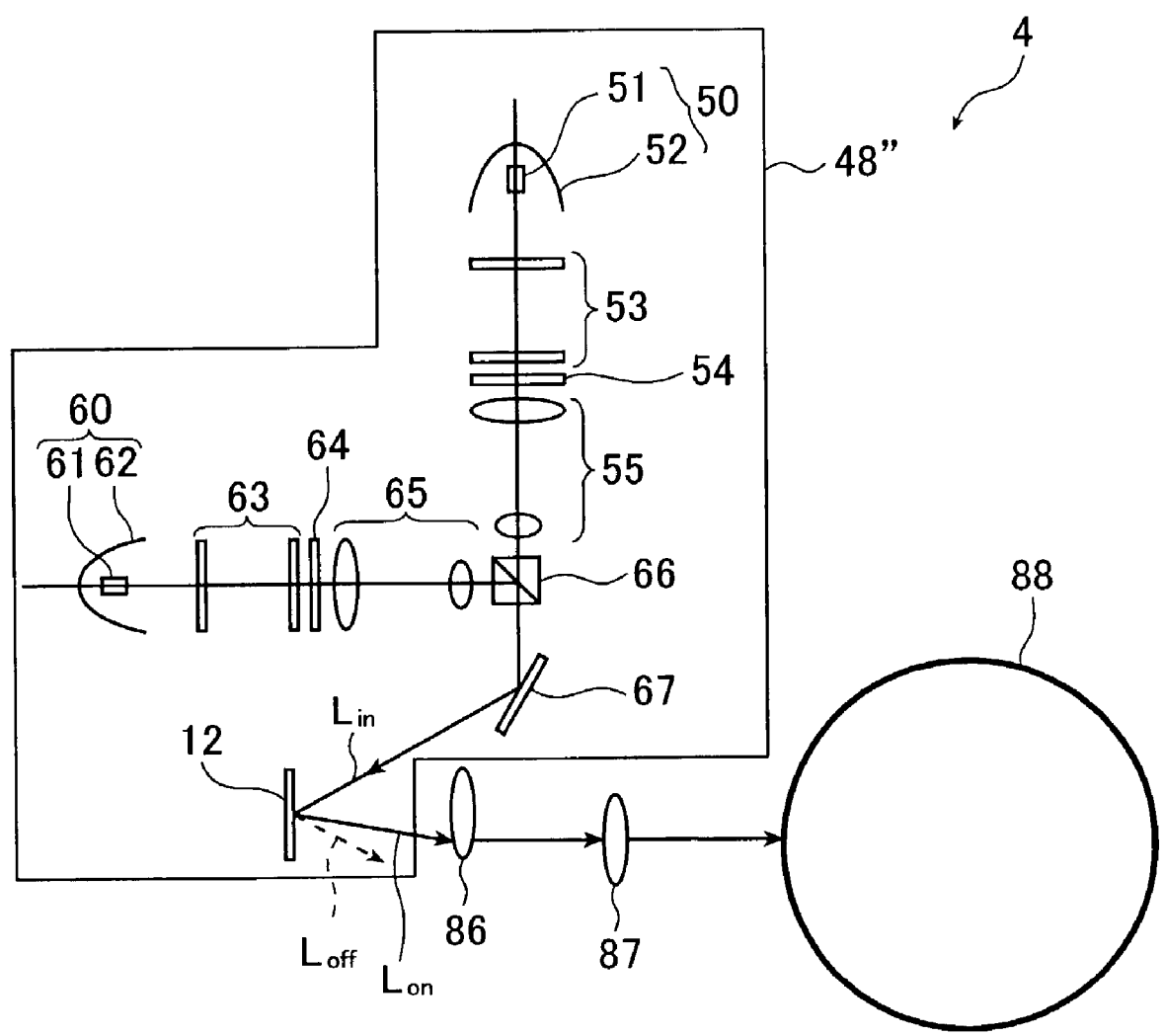
FIG. 7 is a view showing the schematic arrangement of an example of an image recording apparatus using the illumination optical system of the present invention.
Figure 8:
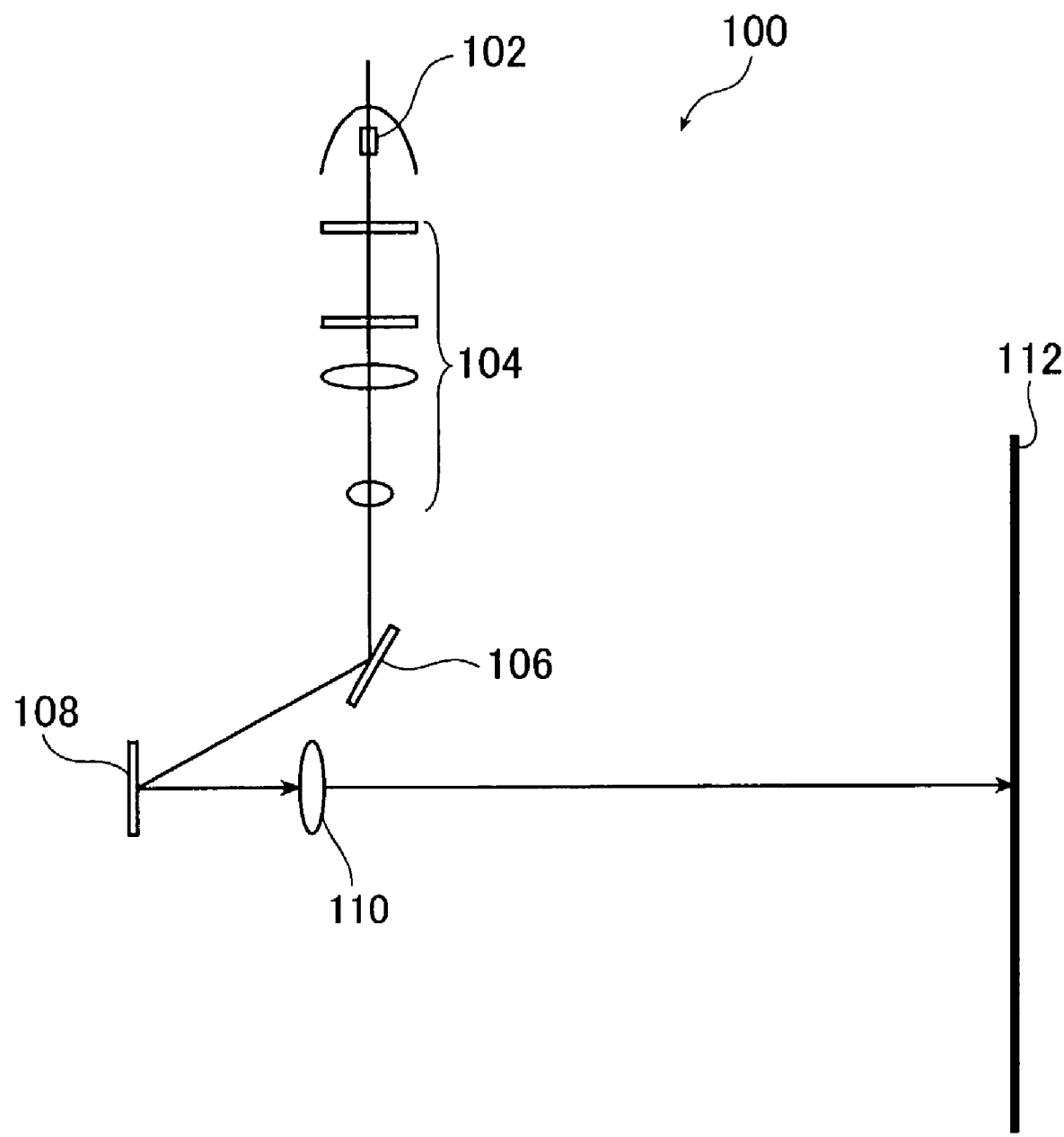
FIG. 8 is a view showing an example of the arrangement of a conventional image exposure apparatus.
Figure 9:
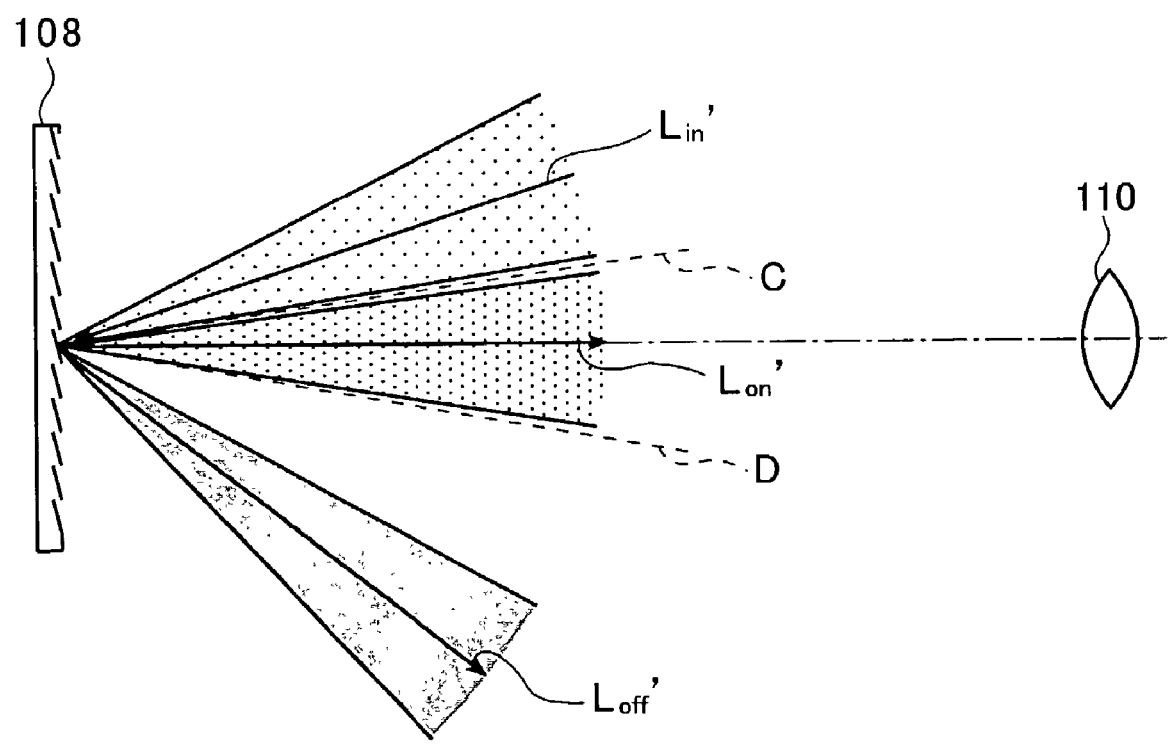
FIG. 9 is a view explaining a conventional illumination optical system.

FIG. 7 shows the electrophotographic image recording apparatus 4.

The image recording apparatus 4 which includes a drum-shaped light-sensitive body 88 forms an electrostatic latent image by electrifying the light-sensitive body 88, and then records an image by toner development and transfer.

The image recording apparatus 4 as described above comprises an illumination optical system 48", a collimator lens optical system 86, a focusing lens optical system 87, and the light-sensitive body 88.

As in the illumination optical system 48 of the projector 2 and the illumination optical system 48' of the light molding apparatus 3, the illumination optical system 48" uses the polarization converters 54 and 64 to convert the non-polarized light from the light source lamps 51 and 61 to P-polarized light and S-polarized light, respectively, which are then combined together through the polarized beam splitter 66 to thereby produce light whose quantity of light is increased. The composite light is reflected by the mirror 67 before being incident on the MMA 12 as the incident light $L_{in}$.

The incident light $L_{in}$ on the MMA 12 has a light flux divergent/convergent angle of 40° as shown in FIG. 2 and moreover is incident on the MMA 12 in a state in which the principal ray thereof inclines 30° with respect to a normal line to the surface on which the micro mirrors of the MMA 12 are arranged. Accordingly, the outgoing light $L_{on}$ and outgoing light $L_{off}$ as shown in FIG. 2 are produced, and outgoing light $L_{on}$ is imaged on the light-sensitive body 88 through the collimator lens optical system 86 and the focusing lens optical system 87, whereby the electrostatic latent image is recorded as a visible image. At the time, it is needless to say that the totally reflecting prism 42 described above may be disposed in front of the surface on which the micro mirrors of the MMA 12 are arranged.

Further, the illumination optical system of the present invention is by no means limited to those used in the above apparatuses. It may be used in a projector of, for example, a rear projection type television or video wall.

While the image display apparatus and the image exposure apparatus described above use the outgoing light $L_{on}$ for display and exposure, they may use the outgoing light $L_{off}$ for the display and exposure.

Further, the MMA whose micro mirrors have rotational angles of +10° and −10° is used as the spatial light modulator for determining the deflecting direction of the outgoing light $L_{on}$ and $L_{off}$, which is not however the sole case of the invention. The incident direction and light flux divergent/convergent angle of the incident light may be set according to the deflecting direction of the outgoing light that is determined according to the rotational angles of the micro mirrors. It is needless to say that the deflecting direction of the outgoing light can be optionally set by using a reflection-diffraction type element such as the grating light valve described above as the spatial light modulator, and the incident direction and light flux divergent/convergent angle of the incident light may be set according to the deflecting direction of the reflection-diffraction type element.

Further, in the illumination optical system described above, the deflecting direction of the principal ray of any of the outgoing light inclines with reference to a normal line to the surface on which the micro mirrors of the MMA are arranged. However, it is possible to set the angle between the incident direction of the principal ray of incident light and a first deflecting direction of outgoing light to be approximately equal to the angle between the first deflecting direction and a second deflecting direction of the outgoing light and to cause any one of the first and second deflecting directions to agree with a normal direction of the surface on which the micro mirrors of the MMA are arranged.

While the illumination optical system of the present invention, and the image display apparatus and the image exposure apparatus using the illumination optical system have been described above in detail, the present invention is by no means limited to the above examples and it is needless to say that various improvements and modifications can be made within the range which does not depart from the gist of the present invention.

As described above in detail, according to the present invention, since the angle between, for example, the incident direction of the principal ray of the incident light $L_{in}$ and the deflecting direction of the principal ray of the outgoing light $L_{on}$ is approximately equal to the angle between the deflecting direction of the principal ray of the outgoing light $L_{on}$ and the deflecting direction of the principal ray of the outgoing light $L_{off}$, the light flux of the incident light can be increased, thereby a quantity of light can be increased. At the time, the employment of the optical element such as the totally reflecting prism enables definite separation of activated light from deactivated light, which ensures prevention of the contrast deterioration of an image formed.

What is claimed is:

1. An illumination optical system comprising:
    an illumination light source; and
    a spatial light modulator having a plurality of elements which reflect incident light from the illumination light source to form outgoing light and which flexibly switch a deflecting direction of a principal ray of the outgoing light between at least two directions including a first deflecting direction and a second deflecting direction, wherein a first angle between an incident direction of a principal ray of the incident light and the first deflecting direction is set to be approximately equal to a second angle between the first deflecting direction and the second deflecting direction, and wherein a light flux divergent/convergent angle of the incident light is set to be equal to or smaller than the first angle between the incident direction of the principal ray of the incident light and the first deflecting direction.

2. The illumination optical system according to claim 1 further comprising:

a first polarizing filter to convert the incident light to a P-polarized light; and a second polarizing filter to convert the incident light to a S-polarized light;

wherein the P-polarized light and the S-polarized light are combined to form the incident light.

3. The illumination optical system according to claim 1, wherein the light flux divergent/convergent angle of the incident light is larger than an angle of 20 degrees.

4. The illumination optical system according to claim 1, wherein the light flux divergent/convergent angle of the incident light is larger than an angle of 20 degrees and equal to or smaller than an angle of 40 degrees.

5. The illumination optical system according to claim 1, wherein the illuminating optical system further comprises:

a first polarizing filter to convert light from a first illumination light source to a P-polarized light; and a second polarizing filter to convert light from a second illumination light source to a S-polarized light;

wherein the P-polarized light and the S-polarized light are combined to form the incident light.

6. An illumination optical system comprising: an illumination light source;

a spatial light modulator having a plurality of elements which reflect incident light from the illumination light source to form outgoing light and which flexibly switch a deflecting direction of a principal ray of the outgoing light between at least two directions including a first deflecting direction and a second deflecting direction, wherein a first angle between an incident direction of a principal ray of the incident light and the first deflecting direction is set to be approximately equal to a second angle between the first deflecting direction and the second deflecting direction; and an optical element which is disposed in front of the spatial light modulator, and which has a first boundary surface for totally reflecting the incident light traveling to the spatial light modulator and causing the outgoing light in the first deflecting direction to pass therethrough and a second boundary surface for causing the outgoing light in the first deflecting direction to pass therethrough and totally reflecting the outgoing light in the second deflecting direction.

7. The illumination optical system according to claim 6, wherein the optical element is a prism comprising:

a first boundary surface which reflects the incident light and passes through the first deflected light; and a second boundary surface which passes through the first deflected light and reflects the second deflected light.

8. The illumination optical system according to claim 7, wherein the first and second boundary surfaces are formed by air gaps in the prism.

9. An illumination optical system comprising:

an illumination light source;

a spatial light modulator having a plurality of elements which reflect incident light from the illumination light source to form outgoing light and which flexibly switch a deflecting direction of a principal ray of the outgoing light between at least two directions including a first deflecting direction and a second deflecting direction; and a lens disposed in a path of the outgoing light after the spatial light modulator, wherein the first and second deflecting directions of the principal ray of the outgoing light are inclined with reference to a normal line to an element array surface of the spatial light modulator, wherein an incident direction of a principal ray of the incident light is inclined with reference to the normal line to the element array surface of the spatial light modulator, and wherein the principal ray of the outgoing light in at least one of the first deflecting direction and the second deflecting direction is incident on the lens at an angle inclined with respect to an optical axis of the lens.

10. The illumination optical system according to claim 9, wherein a first angle between an incident direction of a principal ray of the incident light and the first deflecting direction is set to be approximately equal to a second angle between the first deflecting direction and the second deflecting direction.

11. The illumination optical system according to claim 9, further comprising:

an optical element which is disposed in front of the spatial light modulator, and which has a first boundary surface for totally reflecting the incident light traveling to the spatial light modulator and causing the outgoing light in the first deflecting direction to pass therethrough and a second boundary surface for causing the outgoing light in the first deflecting direction to pass therethrough and totally reflecting the outgoing light in the second deflecting direction.

12. The illumination optical system according to claim 11, wherein the optical element is a prism comprising:

a first boundary surface which reflects the incident light and passes through the first deflected light; and a second boundary surface which passes through the first deflected light and reflects the second deflected light.

13. The illumination optical system according to claim 12, wherein the first and second boundary surfaces are formed by air gaps in the prism.

14. The illumination optical system according to claim 9 further comprising:

a first polarizing filter to convert the incident light to a P-polarized light; and a second polarizing filter to convert the incident light to a S-polarized light;

wherein the P-polarized light and the S-polarized light are combined to form the incident light.

15. The illumination optical system of claim 9, wherein the lens is disposed next to the spatial light modulator.

16. The illumination optical system of claim 9, wherein the principal ray of the outgoing light is always incident on the lens at an angle inclined with respect to an optical axis of the lens.

17. The illumination optical system according to claim 9, wherein the illuminating optical system further comprises:

a first polarizing filter to convert light from a first illumination light source to a P-polarized light; and a second polarizing filter to convert light from a second illumination light source to a S-polarized light;

wherein the P-polarized light and the S-polarized light are combined to form the incident light.

18. The illumination optical system according to claim 9, wherein the principal ray of the outgoing light is a ray in a geometric center of the outgoing light.

19. An illumination optical system comprising:
an illumination light source; and
a spatial light modulator having a plurality of elements which reflect incident light from the illumination light source to form outgoing light and which flexibly switch a deflecting direction of a principal ray of the outgoing light between at least two directions including a first deflecting direction and a second deflecting direction,
wherein the first and second deflecting directions of the principal ray of the outgoing light are inclined with reference to a normal line to an element array surface of the spatial light modulator,
wherein an incident direction of a principal ray of the incident light is inclined with reference to the normal line to the element array surface of the spatial light modulator, and
wherein a light flux divergent/convergent angle of the incident light is set to be equal to or smaller than the first angle between the incident direction of the principal ray of the incident light and the first deflecting direction.

20. The illumination optical system according to claim 19, wherein the light flux divergent/convergent angle of the incident light is larger than an angle of 20 degrees.

21. The illumination optical system according to claim 19, wherein the light flux divergent/convergent angle of the incident light is larger than an angle of 20 degrees and equal to or smaller than an angle of 40 degrees.

22. An image display apparatus comprising an illumination optical system which includes:
an illumination light source; and
a spatial light modulator having a plurality of elements which reflect incident light from the illumination light source to form outgoing light and which flexibly switch a deflecting direction of a principal ray of the outgoing light between at least two directions including a first deflecting direction and a second deflecting direction,
wherein a first angle between an incident direction of a principal ray of the incident light and the first deflecting direction is set to be approximately equal to a second angle between the first deflecting direction and the second deflecting direction,
wherein one of the outgoing light in the first deflecting direction and the outgoing light in the second deflecting direction is used to display an image, and
wherein a light flux divergent/convergent angle of the incident light is set to be equal to or smaller than the first angle between the incident direction of the principal ray of the incident light and the first deflecting direction.

23. The image display apparatus according to claim 22, wherein the illuminating optical system further comprises:
a first polarizing filter to convert the incident light to a P-polarized light; and
a second polarizing filter to convert the incident light to a S-polarized light;
wherein the P-polarized light and the S-polarized light are combined to form the incident light.

24. The image display apparatus according to claim 22, wherein the light flux divergent/convergent angle of the incident light is larger than an angle of 20 degrees.

25. The image display apparatus according to claim 22, wherein the light flux divergent/convergent angle of the incident light is larger than an angle of 20 degrees and equal to or smaller than an angle of 40 degrees.

26. The image display apparatus according to claim 22, wherein the illuminating optical system further comprises:
a first polarizing filter to convert light from a first illumination light source to a P-polarized light; and
a second polarizing filter to convert light from a second illumination light source to a S-polarized light;
wherein the P-polarized light and the S-polarized light are combined to form the incident light.

27. An image display apparatus comprising an illumination optical system which includes:
an illumination light source;
a spatial light modulator having a plurality of elements which reflect incident light from the illumination light source to form outgoing light and which flexibly switch a deflecting direction of a principal ray of the outgoing light between at least two directions including a first deflecting direction and a second deflecting direction; and
a lens disposed in a path of the outgoing light after the spatial light modulator,
wherein the first and second deflecting directions of the principal ray of the outgoing light are inclined with reference to a normal line to an element array surface of the spatial light modulator,
wherein an incident direction of a principal ray of the incident light is inclined with reference to the normal line to the element array surface of the spatial light modulator,
wherein the principal ray of the outgoing light in at least one of the first deflecting direction and the second deflecting direction is incident on the lens at an angle inclined with reference to an optical axis of the lens, and
wherein one of the outgoing light in the first deflecting direction and the outgoing light in the second deflecting direction is used to display an image.

28. The image display apparatus according to claim 27, wherein the illuminating optical system further comprises:
a first polarizing filter to convert the incident light to a P-polarized light; and
a second polarizing filter to convert the incident light to a S-polarized light;
wherein the P-polarized light and the S-polarized light are combined to form the incident light.

29. The image display apparatus of claim 27, wherein the lens is disposed next to the spatial light modulator.

30. The image display apparatus of claim 27, wherein the principal ray of the outgoing light is always incident on the lens at an angle inclined with respect to an optical axis of the lens.

31. The image display apparatus according to claim 27, wherein the illuminating optical system further comprises:
a first polarizing filter to convert light from a first illumination light source to a P-polarized light; and
a second polarizing filter to convert light from a second illumination light source to a S-polarized light;
wherein the P-polarized light and the S-polarized light are combined to form the incident light.

32. An image exposure apparatus having an illumination optical system which includes:

an illumination light source; and a spatial light modulator having a plurality of elements which reflect incident light from the illumination light source to form outgoing light and which flexibly switch a deflecting direction of a principal ray of the outgoing light between at least two directions including a first deflecting direction and a second deflecting direction, wherein a first angle between an incident direction of a principal ray of the incident light and the first deflecting direction is set to be approximately equal to a second angle between the first deflecting direction and the second deflecting direction, wherein one of the outgoing light in the first deflecting direction and the outgoing light in the second deflecting direction is used for exposure, and wherein a light flux divergent/convergent angle of the incident light is set to be equal to or smaller than the first angle between the incident direction of the principal ray of the incident light and the first deflecting direction.

33. The image exposure apparatus according to claim 32, wherein the illuminating optical system further comprises:
a first polarizing filter to convert the incident light to a P-polarized light; and
a second polarizing filter to convert the incident light to a S-polarized light;
wherein the P-polarized light and the S-polarized light are combined to form the incident light.

34. The image exposure apparatus according to claim 32, wherein the light flux divergent/convergent angle of the incident light is larger than an angle of 20 degrees.

35. The image exposure apparatus according to claim 32, wherein the light flux divergent/convergent angle of the incident light is larger than an angle of 20 degrees and equal to or smaller than an angle of 40 degrees.

36. The image exposure apparatus according to claim 32, wherein the illuminating optical system further comprises:
a first polarizing filter to convert light from a first illumination light source to a P-polarized light; and
a second polarizing filter to convert light from a second illumination light source to a S-polarized light;
wherein the P-polarized light and the S-polarized light are combined to form the incident light.

37. An image exposure apparatus having an illumination optical system which includes:
an illumination light source;
a spatial light modulator having a plurality of elements which reflect incident light from the illumination light source to form outgoing light and which flexibly switch a deflecting direction of a principal ray of the outgoing light between at least two directions including a first deflecting direction and a second deflecting direction; and
a lens disposed in a path of the outgoing light after the spatial light modulator,
wherein the first and second deflecting directions of the principal ray of the outgoing light are inclined with reference to a normal line to an element array surface of the spatial light modulator,
wherein an incident direction of a principal ray of the incident light is inclined with reference to the normal line to the element array surface of the spatial light modulator,
wherein the principal ray of the outgoing light in at least one of the first deflecting direction and the second deflecting direction is incident on the lens at an angle inclined with reference to an optical axis of the lens, and
wherein one of the outgoing light in the first deflecting direction and the outgoing light in the second deflecting direction is used for exposure.

38. The image display apparatus according to claim 37, wherein the illuminating optical system further comprises:
a first polarizing filter to convert the incident light to a P-polarized light; and
a second polarizing filter to convert the incident light to a S-polarized light;
wherein the P-polarized light and the S-polarized light are combined to form the incident light.

39. The image exposure apparatus of claim 37, wherein the lens is disposed next to the spatial light modulator.

40. The image exposure apparatus of claim 37, wherein the principal ray of the outgoing light is always incident on the lens at an angle inclined with respect to an optical axis of the lens.

41. The image exposure apparatus according to claim 37, wherein the illuminating optical system further comprises:
a first polarizing filter to convert light from a first illumination light source to a P-polarized light; and
a second polarizing filter to convert light from a second illumination light source to a S-polarized light;
wherein the P-polarized light and the S-polarized light are combined to form the incident light.

42. An image recording apparatus comprising an illumination optical system which comprises:
an illumination light source; and
a spatial light modulator having a plurality of elements which reflect incident light from the illumination light source to form outgoing light and which flexibly switch a deflecting direction of a principal ray of the outgoing light between at least two directions including a first deflecting direction and a second deflecting direction,
wherein a first angle between an incident direction of a principal of the incident light and the first deflecting direction is set to be approximately equal to a second angle between the first deflecting direction and the second deflecting direction,
wherein one of the outgoing light in the first deflecting direction and the outgoing light in the second deflecting direction us used for recording, and
wherein a light flux divergent/convergent angle of the incident light is set to be equal to or smaller than the first angle between the incident direction of the principal ray of the incident light and the first deflecting direction.

43. The image recording apparatus according to claim 42, wherein the illuminating optical system further comprises:
a first polarizing filter to convert the incident light to a P-polarized light; and
a second polarizing filter to convert the incident light to a S-polarized light;
wherein the P-polarized light and the S-polarized light are combined to form the incident light.

44. The image recording apparatus according to claim 42, wherein the light flux divergent/convergent angle of the incident light is larger than an angle of 20 degrees.

45. The image recording apparatus according to claim 42, wherein the light flux divergent/convergent angle of the incident light is larger than the angle of 20 degrees and equal to or smaller than an angle of 40 degrees.

46. An image recording apparatus comprising an illumination optical system which comprises:

an illumination light source;

a spatial light modulator having a plurality of elements which reflect incident light from the illumination light source to form outgoing light and which flexibly switch a deflecting direction of a principal ray of the outgoing light between at least two directions including a first deflecting direction and a second deflecting direction; and a lens disposed in a path of the outgoing light after the spatial light modulator, wherein the first and second deflecting directions of the principal ray of the outgoing light are inclined with reference to a normal line to an element array surface of the spatial light modulator, wherein an incident direction of a principal ray of the incident light is inclined with reference to the normal line to the element array surface of the spatial light modulator, wherein the principal ray of the outgoing light in at least one of the first deflecting direction and the second deflecting direction is incident on the lens at an angle inclined with reference to an optical axis of the lens, and wherein one of the outgoing light in the first deflecting direction and the outgoing light in the second deflecting direction is used for recording.

47. The image recording apparatus according to claim 46, wherein the illuminating optical system further comprises:

a first polarizing filter to convert the incident light to a P-polarized light; and a second polarizing filter to convert the incident light to a S-polarized light;

wherein the P-polarized light and the S-polarized light are combined to form the incident light.

48. The image recording apparatus of claim 46, wherein the lens is disposed next to the spatial light modulator.

49. The image recording apparatus of claim 46, wherein the principal ray of the outgoing light is always incident on the lens at an angle inclined with respect to an optical axis of the lens.

* * * * *